Nov. 28, 1933.   C. H. KASCH   1,936,627
HYDRAULIC CLUTCH
Filed Aug. 14, 1930
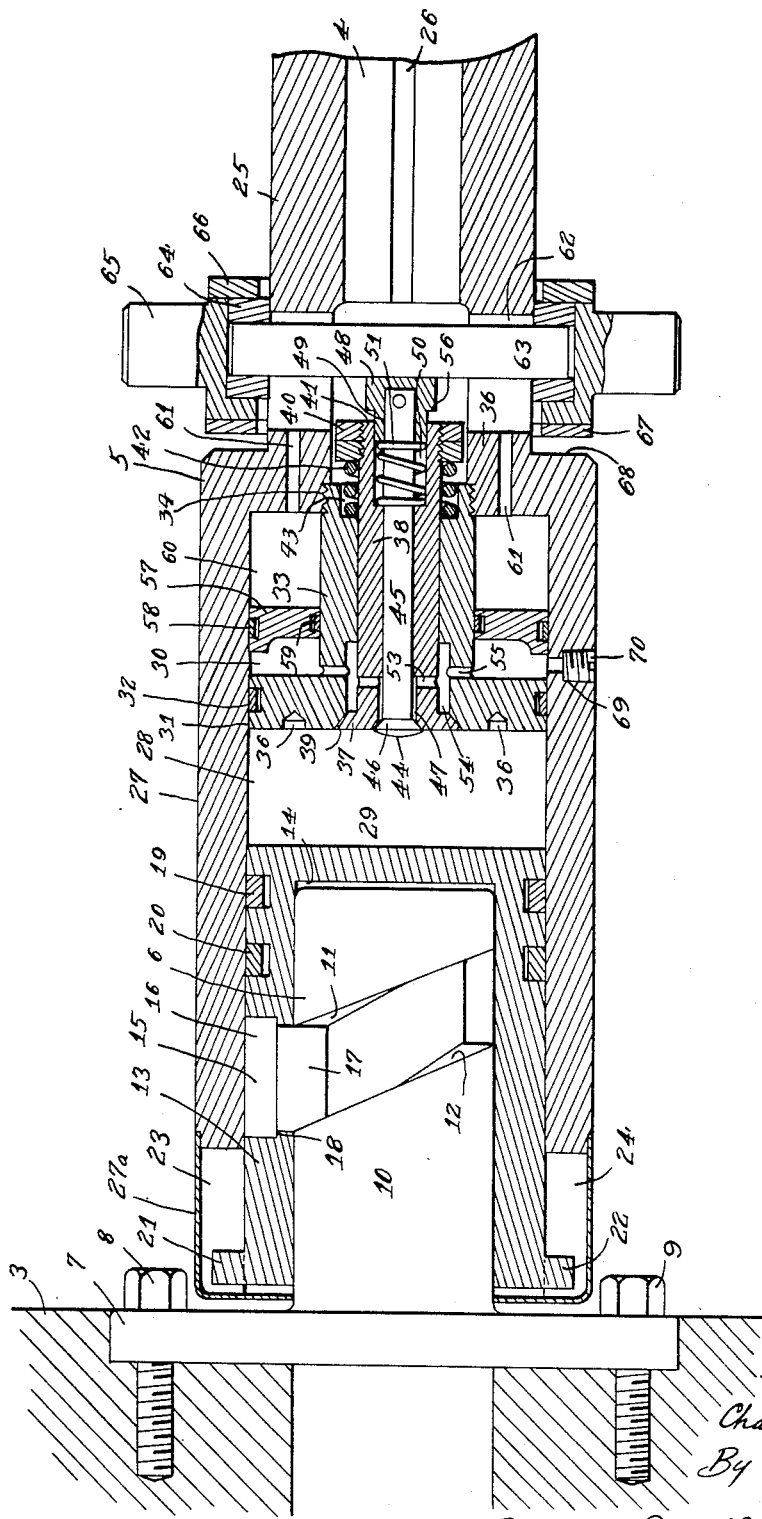

Patented Nov. 28, 1933

1,936,627

UNITED STATES PATENT OFFICE 1,936,627

HYDRAULIC CLUTCH

Charles H. Kasch, Rockford, Ill.

Application August 14, 1930. Serial No. 475,354

12 Claims. (Cl. 192—59)

My invention relates to hydraulic clutches and has special reference to a hydraulic clutch adapted to be employed in the usual type of motor vehicle, though utilizable in numerous other places where power is to be transmitted.

The usual type of disc clutch, as employed in motor vehicles and many other places, is subject to many disadvantages. After a certain amount of use the plates become worn and the clutch exhibits a tendency to grab so that the motion of the driving body is not smoothly and uniformly taken up by the driven body.

I have aimed to provide a hydraulic clutch wherein the rate of engagement between the driving and the driven members may be accurately regulated by the operator.

Another object of my invention is the provision of a hydraulic clutch having a cylinder and a piston arranged to be reciprocated therein and means for confining liquid in the cylinder to prevent reciprocation of the piston whereby motion is transmitted from a driving member to a driven member.

I have further aimed to provide a hydraulic clutch having a cylinder attached to the driven member and a cam operated piston operated from the driving member and adapted to be reciprocated within the cylinder, and means permitting liquid to be drawn into and driven out of this cylinder by reciprocation of the piston, or to confine liquid in said cylinder to prevent the reciprocation of the piston and cause simultaneous rotation of the piston and cylinder with the driving member.

Another object of the invention is to provide a hydraulic clutch having a reservoir provided with a floating wall.

A still further object of the invention is the provision of a hydraulic clutch having improved means for engaging and disengaging the same.

Another object of the invention is the provision of a hydraulic clutch which may be manufactured at a substantially smaller cost than has heretofore been possible.

Other objects and attendant advantages will be apparent to those skilled in the art from the following description and the accompanying drawing in which the figure is a longitudinal section through my improved hydraulic clutch.

The modification shown in the drawing is one adapted for use in the conventional type of automobile, and the numeral 3 designates generally the driving member thereof, such as the flywheel of the motor, while the numeral 4 designates the driven member thereof, such as the shaft of a transmission. The clutch consists of a driven portion designated generally by the numeral 5 and a driving portion designated generally by the numeral 6. It will be seen that the clutch may be interposed between the driving and the driven member either in the manner indicated or by employing the portion 5 as the driving portion and the portion 6 as the driven portion, such a change being easily within the skill of those skilled in the art.

The driving portion 6 includes a plate 7 secured to the driving member 3 by means of stud bolts 8 and 9. A cam 10 is secured to the plate 7 or may be integral therewith at the axis of rotation of the driving member 3 and is provided with a groove on the circumference thereof forming cam surfaces 11 and 12, the groove extending diagonally along the surface of the cam 10, as shown. A piston 13 is provided with a central cylindrical opening 14 of suitable size to slidably receive the cam 10 and is provided with an opening in its side wall to receive a cam pin 15. The cam pin may advantageously be provided with a head portion 16 and a cam following portion 17, the head portion being of greater diameter than the cam following portion 17 to bear against a shoulder 18 on the piston. The head portion 16 of the cam pin is arranged to lie flush with the outer surface of the piston, while the cam following portion 17 is adapted to project into the groove in the cam 10 and bear against the cam faces 11 and 12 thereof. Piston rings 19 and 20 on the piston 13 are arranged to cooperate with the walls of a cylinder presently to be described. The outer end of the piston 13 is provided with outwardly projecting keys 21 and 22 receivable in keyways 23 and 24 on the cylinder.

The driven portion 5 includes a connecting end 25 adapted to be fixedly secured to the driven member 4 through a key receivable in a keyway 26 on the driven member and a cylinder 27 which may preferably be formed integral with the connecting end 25. The cylinder 27 is arranged to provide a cylinder chamber 28 adapted to receive the piston 13 to reciprocate therein. The piston rings 19 and 20 serve to prevent the passage of liquid from the cylinder chamber 28 along the interfaces of the piston and cylinder and the escape thereof from the system. The keyways 23 and 24 are formed in the forward end of the cylinder 27 and through contact with the projections 21 and 22 on the piston, prevent the latter from turning in the cylinder. A dust cover 27a may be secured to the outer surface of the cylinder 27 to prevent dust from entering the keyways 23 and 24 or from coming in contact with the bearing surfaces of the members exposed in this area.

The cylinder chamber 28 is divided into a pressure chamber 29 and a reservoir 30 by means of a cylinder head 31 positioned therein. Liquid is prevented from passing from the pressure chamber 29 to the reservoir 30 along the interface between the cylinder head and the cylinder by means of packing 32 on the cylinder head. The cylinder head 31 may advantageously have, integrally formed therewith, a valve cage 33, the valve cage 33 being threaded at one end, as shown at 34, to engage the rear end of the cylinder 27, whereby the cylinder head and the valve cage may be simultaneously secured within the cylinder. Sockets 36 may be provided on the forward side of the cylinder head to permit the valve cage 33 to be securely screwed into the end of the cylinder 27 by means of a spanner wrench or the like.

A release valve 37, having a valve stem 38, slidably positioned within the valve cage 33, has a valve face 39 cooperable with an opposed seat on the forward side of the cylinder head 31, as plainly apparent from the drawing. A shoulder 40, which may be formed from a pair of threaded nuts or in any other well known manner, has threaded engagement with the free end of the valve stem 38, as shown at 41. A spring 42 is positioned on the valve stem 38 and is arranged to bear at one end against the shoulder 40 and at its opposite end against the end of the valve cage 33. A recess 43 may advantageously be provided in the end of the valve cage 33 to receive the spring 42 in the manner shown. The function of the spring 42 is to urge the valve stem 38 to the right facing the figure, thus normally maintaining the valve 37 in its closed position.

A bleeder valve 44, having a bleeder valve stem 45 axially and slidably positioned in the valve stem 38, is provided with a valve face 46 arranged to normally close an opening 47 in the valve 37. A bleeder valve cap 48 is positioned on the free end of the bleeder valve stem 45 and is provided with a portion 49 receivable in an opening 50 in the end of the valve stem 38. A spring 51 is arranged to act between the valve stem 38 and the portion 49 of the bleeder valve cap 48 to urge the valve 44 into a closed position.

When the bleeder valve cap 48 is urged to the left facing the figure, which is brought about by means presently to be described, the bleeder valve 44 is opened, permitting liquid to flow from the pressure chamber 29 through the opening 47 and passageways 53, 54 and 55 into the reservoir 30. However, as the bleeder valve cap 48 is moved further inward a shoulder 56 thereon is brought into contact with the end of the valve stem 38 urging the valve 37 to an open position against the pressure of the spring 42. The valve 37 is thereby opened permitting liquid in the liquid pressure chamber 29 to flow directly through the passage ways 54 and 55 into the reservoir 30. Thus the function of the bleeder valve 44 is to permit the pressure in the pressure chamber 29 and the reservoir 30 to be equalized by moving a valve having only a small amount of area. Due to the small area of the valve 44 it may be easily moved against a high liquid pressure in the chamber 29, the pressure in the two chambers being thereby rapidly equalized when the substantially larger valve 37 may be opened to permit the rapid flow of liquid between the chambers 29 and 30.

A floating chamber wall 57 is slidably positioned on the valve cage 33 and has sliding contact with the inner walls of the cylinder 27. Piston rings 58 and 59 serve to prevent the liquid from passing from the reservoir 30 into an air chamber 60 along the walls of the cylinder 27 and along the walls of the cage 33 respectively. Thus when the valve 37 and bleeder valve 44 are opened and liquid is forced into the reservoir 30 by the movement of the piston 13, the wall 57 will move toward the right on the valve cage 33 increasing the capacity of the reservoir 30 and decreasing the volume of the air chamber 60. On the other hand, when liquid is drawn from the reservoir 30 into the pressure chamber 29 by reciprocation of the piston 13, the wall 57 will move toward the left facing the figure, decreasing the capacity of the reservoir 30 and increasing the capacity of the air chamber 60. Air vents 61 are provided to permit air to pass freely into and out of the air chamber 60.

In order to engage and disengage the clutch by opening and closing the valves 44 and 37 a transverse opening 62 is provided in the connecting end of the driven portion. A pin 63 is positioned in the opening 62 to rest against the bleeder valve cap 48, the pin being secured in the opening 62 by means of a bearing 64, and the bearing 64 being slidable longitudinally to move the pin 63 to the left, facing the figure, in the opening 62, thereby opening the valves 44 and 37. A release yoke 65 of conventional design is provided to receive the bearing 64, a plate 66 serving to maintain the bearing 64 within the yoke 65 in the usual manner.

A brake band 67 of conventional frictional material is positioned on the forward side of the yoke 65 and is arranged to be brought into contact with a braking surface 68 arranged on the end of the cylinder 27, whereby when the yoke 65 is moved to the left facing the figure, thereby opening the valves 44 and 37, the brake band 67 will be brought into contact with the surface 68 to stop rotation of the driven portion of the clutch.

An opening 69 is positioned in the cylinder 27 through the walls thereof into the reservoir 30 adjacent to the cylinder head 31. This opening serves to permit liquid to be introduced into the system or removed therefrom when desired, the opening normally being stopped by a threaded plug 70 positioned therein.

The operation of the device is relatively simple and efficient. The driving member 3 will normally be in rotation thereby rotating the cam 10. As the cam 10 rotates the normal tendency will be for the cylinder 13 to be reciprocated through action of the cam surface 11 and 12, since the projections 21 and 22, positioned in the keyways 23 and 24, will prevent rotation in the cylinder. This reciprocation of the piston 13 will occur when the clutch is disengaged and the valves 44 and 37 are in their open position. With the reciprocation of the piston 13 fluid in the pressure chamber 29 will be driven into the reservoir 30 or drawn therefrom according to the direction in which the piston 13 moves. Thus the driven portion 5 will remain stationary and the piston 13 will reciprocate in the pressure chamber 29. However, when the valves 44 and 37 are closed, by movement of the yoke 65, liquid will be trapped in the pressure chamber 29, thus preventing the piston 13 from reciprocating in the cylinder 27. Since the piston 13 is prevented from turning in the cylinder by the projections 21 and 22, it will be necessary for the cylinder 27 and the piston 13 to rotate with the cam 10 and with the driving member 3. This rotation will continue until the valves 44 and 37 are again opened.

It will be seen that I have provided a hydraulic clutch which may be manufactured at comparatively small cost. The device is exceedingly compact since the diameter of the cylinder 27 may be relatively small. The device is such that it may be very easily balanced both statically and dynamically thus reducing the vibrations thereof to a minimum.

The rate of speed at which the clutch may be engaged can be very accurately regulated by the operator due to the accuracy with which the movement of the liquid may be controlled. All of the moving parts are subject to complete lubrication whereby a device of relatively long life is produced.

While I have thus described and illustrated a specific embodiment of my invention I am aware that numerous alterations and changes may be made therein without materially departing from the spirit of the invention and I do not wish to be limited except as required by the prior art and the scope of the appended claims, in which—

I claim:

1. In a power transmitting mechanism the combination with a driving and a driven member, of a cylinder on said driven member, a cylinder head arranged to divide said cylinder into a pressure chamber and a reservoir, a piston in said cylinder, adapted to reciprocate in said pressure chamber having an axial opening and a cam pin projecting therein, a cam on said driving member slidably positioned in said axial opening having a cam groove receiving said pin to reciprocate said piston, means for preventing said piston from turning in said cylinder, and means for controlling the flow of liquid between said pressure chamber and said reservoir.

2. In a power transmitting mechanism the combination with a driving and a driven member, of a cylinder on said driven member having a pressure chamber and a reservoir coaxial with the axis of rotation of said members, a piston in said cylinder coaxial with the axis of rotation of one of said members adapted to be reciprocated in said pressure chamber, a cam on said driving member arranged to reciprocate said piston, means for preventing said piston from turning in said cylinder, a floating wall in said reservoir adapted to confine the liquid therein, means for admitting air to said reservoir to permit said wall to move as the volume of liquid therein changes, and means for controlling the flow of liquid between said pressure chamber and said reservoir.

3. In a power transmitting mechanism the combination with a driving and a driven member, of a cylinder on said driven member having a pressure chamber and a reservoir, a piston in said cylinder adapted to be reciprocated in said pressure chamber, a cam on said driving member arranged to reciprocate said piston, means for preventing said piston from turning in said cylinder, a floating wall in said reservoir adapted to confine the liquid therein, means for admitting air to said reservoir to permit said wall to move as the volume of liquid therein changes, a valve positioned in the end of said cylinder to control the flow of liquid between said pressure chamber and said reservoir, a bleeder adapted to be opened to equalize the pressure between said chambers, whereby to facilitate the opening of said valve, and means for operating said valve and bleeder in timed relation.

4. In a power transmitting mechanism, the combination with a driving and a driven member, of a cylinder on one of said members having a longitudinal bore, a transverse partition in said bore dividing the latter into a pressure chamber and a reservoir, a piston in said cylinder adapted to reciprocate in said pressure chamber, a cam on the other of said members positioned within and arranged to reciprocate said piston, means for preventing said piston from turning in said cylinder, and valve means in said partition for controlling the flow of liquid between said pressure chamber and said reservoir.

5. In a power transmitting mechanism, the combination with a driving and a driven member, of a cylinder on one of said members having a longitudinal bore, a transverse partition in said bore dividing the latter into a pressure chamber and a reservoir, a piston in said cylinder adapted to reciprocate in said pressure chamber, a cam on the other of said members, arranged to reciprocate said piston, means for preventing said piston from turning in said cylinder, and valve mechanism axially positioned on said partition acting longitudinally of said cylinder for controlling the flow of liquid between said pressure chamber and said reservoir.

6. In a power transmitting mechanism, the combination with a driving and a driven member, of a cylinder on one of said members having a longitudinal bore, a transverse partition in said bore dividing the latter into a pressure chamber and a reservoir, a piston in said cylinder adapted to reciprocate in said pressure chamber, a cam on the other of said members arranged to reciprocate said piston, means for preventing said piston from turning in said cylinder, and a pair of concentric valves having different areas exposed in said pressure chamber arranged to be successively actuated to control the flow of liquid between said pressure chamber and said reservoir.

7. In a power transmitting mechanism, the combination with a driving and a driven member, of a cylinder on one of said members having a longitudinal bore, a transverse partition in said bore dividing the latter into a pressure chamber and a reservoir, a piston in said cylinder adapted to reciprocate in said pressure chamber, a cam on the other of said members arranged to reciprocate said piston, means for preventing said piston from turning in said cylinder, a pair of concentric valves having different areas exposed in said pressure chamber, and means movable longitudinally of said cylinder to first open the valve of smaller area to release a part of the pressure in said pressure chamber and upon further movement open the other of said valves to control the flow of liquid between said pressure chamber and said reservoir.

8. In a power transmitting mechanism, the combination with a driving and a driven member, of a cylinder on one of said members having a longitudinal bore, a transverse partition in said bore dividing the latter into a pressure chamber and a reservoir, a piston in said cylinder adapted to reciprocate in said pressure chamber, a cam on the other of said members arranged to reciprocate said piston, means for preventing said piston from turning in said cylinder, a pair of concentric valves having different areas exposed in said pressure chamber, means movable longitudinally of said cylinder to first open the valve of smaller area to release a part of the pressure in said pressure chamber and upon further movement open the other of said valves to control the flow of liquid between said pressure chamber and said reservoir, and spring means for normally maintaining said valves in a closed position.

9. In a power transmitting mechanism, the combination with a driving and a driven member, of a cylinder on one of said members having a pressure chamber provided with an open end and a reservoir, a piston in the open end of said chamber adapted to be reciprocated in said pressure chamber, a cam on the other of said members arranged to reciprocate said piston, means for preventing said piston from turning in said cylinder, means for controlling the flow of liquid between said pressure chamber and said reservoir, and means for substantially enclosing the open end of said cylinder to exclude extraneous matter.

10. In a power transmitting mechanism, the combination with a driving and a driven member, of a cylinder on one of said members having a longitudinally adjacent pressure chamber and reservoir, a piston in the open end of said cylinder adapted to be reciprocated in said pressure chamber, a cam on the other of said members arranged to reciprocate said piston, means for preventing said piston from turning in said cylinder, and means arranged to be manually moved longitudinally of said cylinder to regulate the flow of liquid between said chamber and said reservoir.

11. In a power transmitting mechanism, the combination with a driving and a driven member, of a cylinder on one of said members having a longitudinal bore providing a closed and an open end, a transverse partition in said bore dividing the latter into a pressure chamber and a reservoir, a piston in the open end of said cylinder adapted to be reciprocated in said pressure chamber, a cam on the other of said members arranged to reciprocate said piston, means for preventing said piston from turning in said cylinder, a movable member intermediate said partition and the closed end of said cylinder arranged to confine the liquid to a portion of said reservoir, and means for controlling the flow of liquid between said pressure chamber and said reservoir.

12. In a power transmitting mechanism, the combination with coaxial driving and driven members, of a cylinder on one of said members having a pressure chamber coaxial with said members, a piston in said cylinder adapted to be reciprocated in said pressure chamber, a cam on the other of said members having an annular cam surface concentric with the axis of rotation of said members arranged to reciprocate the piston, means for preventing the piston from turning in the cylinder upon rotation of said cam, and an expansible reservoir in one end of said cylinder, one wall of said reservoir constituting the end wall of said pressure chamber, and valve means substantially at the axis of rotation of said cylinder for controlling the flow of liquid between said pressure chamber and said reservoir.

CHARLES H. KASCH.